US012577438B2

(12) United States Patent
Toyama et al.

(10) Patent No.: US 12,577,438 B2
(45) Date of Patent: Mar. 17, 2026

(54) ADHESIVE SHEET LAMINATE AND METHOD FOR MANUFACTURING SAME

(71) Applicant: YUPO CORPORATION, Tokyo (JP)

(72) Inventors: Ryota Toyama, Ibaraki (JP); Hiroshi Koike, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 763 days.

(21) Appl. No.: 17/914,091

(22) PCT Filed: Mar. 17, 2021

(86) PCT No.: PCT/JP2021/010949
    § 371 (c)(1),
    (2) Date: Sep. 23, 2022

(87) PCT Pub. No.: WO2021/193312
    PCT Pub. Date: Sep. 30, 2021

(65) Prior Publication Data
    US 2023/0151250 A1     May 18, 2023

(30) Foreign Application Priority Data

Mar. 27, 2020     (JP) ................................. 2020-058708

(51) Int. Cl.
| | |
|---|---|
| *C09J 7/29* | (2018.01) |
| *B32B 7/022* | (2019.01) |
| *B32B 7/027* | (2019.01) |
| *B32B 7/12* | (2006.01) |
| *B32B 27/08* | (2006.01) |
| *B32B 27/30* | (2006.01) |
| *B32B 27/32* | (2006.01) |
| *C09J 7/38* | (2018.01) |
| *C09J 7/40* | (2018.01) |
| *B29C 48/00* | (2019.01) |
| *B29K 23/00* | (2006.01) |
| *B29K 105/00* | (2006.01) |
| *B32B 27/18* | (2006.01) |

(52) U.S. Cl.
CPC .............. *C09J 7/381* (2018.01); *B32B 7/022* (2019.01); *B32B 7/027* (2019.01); *B32B 7/12* (2013.01); *B32B 27/08* (2013.01); *B32B 27/302* (2013.01); *B32B 27/306* (2013.01); *B32B 27/32* (2013.01); *C09J 7/29* (2018.01); *C09J 7/405* (2018.01); *B29C 48/0018* (2019.02); *B29K 2023/06* (2013.01); *B29K 2023/086* (2013.01); *B29K 2023/12* (2013.01); *B29K 2105/0097* (2013.01); *B32B 27/18* (2013.01); *B32B 2250/24* (2013.01); *B32B 2305/026* (2013.01); *B32B 2307/30* (2013.01); *B32B 2307/54* (2013.01); *B32B 2405/00* (2013.01); *C09J 2301/414* (2020.08); *C09J 2423/00* (2013.01); *C09J 2423/045* (2013.01); *C09J 2423/106* (2013.01); *C09J 2425/00* (2013.01); *C09J 2425/005* (2013.01)

(58) Field of Classification Search
CPC ....... C09J 7/381; C09J 7/29; C09J 7/30; C09J 7/243; C09J 7/20; C09J 7/38; C09J 7/405; C09J 2301/414; C09J 2423/00; C09J 2423/045; C09J 2423/106; C09J 2425/00; C09J 2400/243; C09J 2423/10; C09J 2453/00; B32B 27/302; B32B 27/306; B32B 27/32; B32B 2307/30; B32B 2307/54; B32B 2405/00; B32B 2307/516
See application file for complete search history.

(56) References Cited

U.S. PATENT DOCUMENTS

| | | | |
|---|---|---|---|
| 8,080,624 B2 * | 12/2011 | Ito ......................... | C08F 210/06 |
| | | | 526/943 |
| 2011/0039069 A1 | 2/2011 | Igawa et al. | |
| 2011/0250456 A1 | 10/2011 | Okamura et al. | |
| 2013/0084418 A1 | 4/2013 | Takeda et al. | |
| 2013/0164471 A1 | 6/2013 | Suzuki et al. | |
| 2014/0137935 A1 * | 5/2014 | Hiroi ...................... | B32B 27/32 |
| | | | 136/256 |
| 2015/0375477 A1 | 12/2015 | Suzuki et al. | |
| 2018/0265731 A1 | 9/2018 | Ekinaka et al. | |
| 2020/0109314 A1 | 4/2020 | Merrill et al. | |

FOREIGN PATENT DOCUMENTS

| | | |
|---|---|---|
| CN | 102015942 A | 4/2011 |
| CN | 102933674 A | 2/2013 |
| CN | 102971144 A | 3/2013 |

(Continued)

OTHER PUBLICATIONS

Machine translation of JP 2007-320979 A (Year: 2025).*

(Continued)

*Primary Examiner* — Scott R. Walshon

(74) *Attorney, Agent, or Firm* — GREENBLUM & BERNSTEIN, P.L.C.

(57) ABSTRACT

The present invention relates to an adhesive sheet laminate which comprises a substrate layer composed of a thermoplastic resin composition (A) containing a polypropylene-based resin as a main component, an adhesive layer composed of a thermoplastic resin composition (B) containing a specific thermoplastic resin (b) as a main component and having a melt flow rate of 0.1 to 30 g/10 min, and a release layer composed of a thermoplastic resin composition (C) containing a specific thermoplastic resin (c) as a main component and having a melt flow rate of 0.1 to 30 g/10 min, and which has a tensile elastic modulus of 2000 MPa or more.

6 Claims, No Drawings

(56) References Cited

FOREIGN PATENT DOCUMENTS

| CN | 106459684 | A | | 2/2017 |
|----|-----------|---|---|--------|
| CN | 108093628 | A | | 5/2018 |
| CN | 110283545 | A | | 2/2019 |
| CN | 110092936 | A | | 8/2019 |
| CN | 110249017 | A | | 9/2019 |
| EP | 2921278 | A1 | | 9/2015 |
| JE | 2007-161865 | | | 6/2007 |
| JP | 3575616 | B2 | * | 10/2004 |
| JP | 2005-111769 | A | | 4/2005 |
| JP | 2007-31528 | A | | 2/2007 |
| JP | 2007-185781 | A | | 7/2007 |
| JP | 2007-290276 | A | | 11/2007 |
| JP | 2007-320979 | A | | 12/2007 |
| JP | 2009-191113 | A | | 8/2009 |
| JP | 2009-208416 | A | | 9/2009 |
| JP | 2011-006555 | A | | 1/2011 |
| JP | 2013-234321 | A | | 11/2013 |
| JP | 2014-200955 | A | | 10/2014 |
| JP | 2015-93925 | A | | 5/2015 |
| JP | 2015-178248 | A | | 10/2015 |
| JP | 2017-132995 | A | | 8/2017 |
| JP | 2018-135488 | A | | 8/2018 |
| JP | 2019-025739 | A | | 2/2019 |
| JP | 2020-105291 | A | | 7/2020 |
| WO | 2013-153990 | A1 | | 10/2003 |
| WO | 2009/145165 | A1 | | 12/2009 |
| WO | 2015-194059 | A1 | | 12/2015 |
| WO | 2018/012643 | A1 | | 1/2018 |
| WO | 2018-106523 | A1 | | 6/2018 |

OTHER PUBLICATIONS

Machine translation of JP 2013-234321 A (Year: 2025).*
TUFTEC H1221 Product Information Sheet from Asahi-Kasei, available at https://www.asahi-kasei.co.jp/elastomer/en/products/tuftec_h1221.html (Year: 2025).*
Ube Polyethylene data sheet from Ube-Maruzen Polyethylene Co., Ltd., available at https://www.ube.co.jp/ump/en/products/property_ldpe.html (Year: 2025).*
Translation of JP 3575616 B2 (Year: 2025).*
Extended European Search Report issued in EP Patent Application No. 21777073.4, Mar. 1, 2024.
Office Action issued in CN Patent Application No. 202180024053.5, issued on Mar. 20, 2024, translation.
ISR issued in International Patent Application No. PCT/JP2021/010949, May 18, 2021, translation.
Written Opinion of the ISA issued in Int'l Patent Application No. PCT/JP2021/010949, May 18, 2021, translation.
IPRP issued in International Patent Application No. PCT/JP2021/010949, Sep. 22, 2022, translation.
Office Action issued in CN Patent Application No. 202180024053.5, issued Jul. 10, 2024, translation.
Office Action issued in JP Patent Application No. 2022-510015, Apr. 22, 2025, translation.

* cited by examiner

ADHESIVE SHEET LAMINATE AND METHOD FOR MANUFACTURING SAME

TECHNICAL FIELD

The present invention relates to an adhesive sheet laminate and a method for manufacturing same.

BACKGROUND ART

Adhesive sheets are used in various applications, such as packaging/packing, fixing/bundling, and surface protection applications. In an adhesive sheet, a release layer is usually laminated on a surface of an adhesive layer that comes into contact with an adherend, namely an adhesive surface, in order to prevent adhering of foreign matters to the adhesive surface before use of the adhesive sheet or decrease of adhesive force caused thereby.

Regarding such an adhesive sheet, a method for manufacturing a laminated film having an adhesive layer arranged between a release layer and a substrate layer, wherein resins for the layers are co-extruded into a tubular form by a multilayer co-extrusion circular die and then cooled to obtain a laminated film is disclosed in Patent Literature 1. In Patent Literature 2, a self-adhesive laminate formed of a co-extrusion laminated film of three resin layers that form at least a substrate layer, a self-adhesive layer, and a separate substrate layer is disclosed.

In Patent Literature 3, a biaxially-stretched propylene film obtained by melt-kneading resins for use in an adhesive layer and a core layer in an extruder and stretching a laminate sheet constituted of three or two resin layers using a resin merging device is disclosed. In Patent Literature 4, a biaxially-stretched self-adhesive protective film obtained by carrying out sheet forming in such a manner that the resulting sheet is constituted of self-adhesive layer/intermediate layer/non-adhesive layer in this order and biaxially stretching the formed sheet is disclosed.

CITATION LIST

Patent Literature

Patent Literature 1: Japanese Patent Laid-Open No. 2005-111769
Patent Literature 2: Japanese Patent Laid-Open No. 2007-320979
Patent Literature 3: Japanese Patent Laid-Open No. 2014-200955
Patent Literature 4: Japanese Patent Laid-Open No. 2015-93925

SUMMARY OF INVENTION

Technical Problem

However, the laminated film and the laminate described in Patent Literatures 1 and 2 are each prepared by extrusion only, and therefore, the strength is low. On that account, the laminated film or the laminate is sometimes extended or broken when the release layer or the separate substrate layer is peeled off to attach the laminated film or the laminate to an adherend or when the laminated film or the laminate is peeled from the adherend. Moreover, the resin used for the release layer or the separate substrate layer does not have physical properties suitable for co-stretching with the substrate layer, and even if the laminated film or the laminate is simply stretched, an increase in strength cannot be expected. Furthermore, regarding compatibility between good releasability of the release layer or the separate substrate layer and good adhesiveness of the adhesive layer or the self-adhesive layer to an adherend, improvement has been desired.

The films described in Patent Literatures 3 and 4 have high strength because stretching is carried out after co-extrusion, but neither of them has a layer corresponding to a release layer, and the outermost layer is the adhesive layer or the self-adhesive layer. On that account, there is concern about roll staining, occurrence of die drool, low mold-release characteristics, or the like caused by adhering of foreign matters to the surface of the adhesive layer or the self-adhesive layer during the film manufacture, or adhering of the adhesive layer or the self-adhesive layer. Moreover, since these films are each generally handled in a state where the film is wound into a roll, the outermost layer of the film on the side opposite to the adhesive layer is required to have releasability from the adhesive layer, namely anti-blocking properties. The anti-blocking properties and printability are in a trade-off relationship, and therefore, it is difficult to impart functions such as printability to such a film. On the other hand, when the release layer is laminated on the adhesive layer or the self-adhesive layer of the film later, the lamination step is added, and there is concern about an increase in cost.

In the light of the above, it is an object of the present invention to provide an adhesive sheet laminate whose substrate layer, adhesive layer and release layer can be laminated by co-extrusion, which is obtained by co-stretching the co-extrudate, and which is good in both of adhesion properties and releasability and has high strength, and a method for manufacturing same.

Solution to Problem

The present inventors have earnestly studied repeatedly, and as a result, they have found that by selecting resin compositions having specific physical properties as materials of a substrate layer, an adhesive layer and a release layer, particularly materials of an adhesive layer and a release layer, a high-strength adhesive sheet laminate in which co-extrudability for the three layers is good and stretching of a laminate sheet obtained by co-extrusion is possible can be obtained, and they have completed the present invention.

That is to say, the present invention relates to the following [1] to [8].

[1] An adhesive sheet laminate comprising a substrate layer, an adhesive layer, and a release layer laminated on a surface of the adhesive layer, wherein the substrate layer is composed of a thermoplastic resin composition (A) containing a polypropylene-based resin as a main component, the adhesive layer is a layer having an indentation elastic modulus of 100 MPa or less in the thickness direction, and is composed of a thermoplastic resin composition (B) containing a thermoplastic resin (b) as a main component and having a melt flow rate of 0.1 to 30 g/10 min, the thermoplastic resin (b) is compatible with the polypropylene-based resin and has a tensile elastic modulus of 100 MPa or less and a melting point of 175° C. or less, the release layer is composed of a thermoplastic resin composition (C) containing a thermoplastic resin (c) as a main component and having a melt flow rate of 0.1 to 30 g/10 min, the thermoplastic resin (c) is incompatible with the thermoplastic resin (b) and has a melting point of 175° C. or less, and the adhesive sheet laminate has a tensile elastic modulus of 2000 MPa or more.

[2] The adhesive sheet laminate according to the above [1], wherein the thermoplastic resin (b) is an olefin-based elastomer or a styrene-based elastomer.

[3] The adhesive sheet laminate according to the above [1] or [2], wherein the thermoplastic resin (c) is polyethylene having a density of less than 0.94 g/cm³, or a resin other than polyethylene, having a solubility parameter (SP value) of 8.3 or more.

[4] The adhesive sheet laminate according to any one of the above [1] to [3], wherein a tensile elastic modulus of the polypropylene-based resin is 500 MPa or more.

[5] The adhesive sheet laminate according to any one of the above [1] to [4], wherein the thermoplastic resin (c) is a polystyrene-based resin, an ethylene-vinyl alcohol copolymer, or low-density polyethylene.

[6] The adhesive sheet laminate according to any one of the above [1] to [5], wherein the substrate layer is a porous layer.

[7] The adhesive sheet laminate according to any one of the above [1] to [6], comprising a support layer on a surface of the substrate layer on the side opposite to the adhesive layer.

[8] A method for manufacturing the adhesive sheet laminate according to any one of the above [1] to [7], comprising a co-extrusion step of co-extruding the thermoplastic resin composition (A), the thermoplastic resin composition (B), and the thermoplastic resin composition (C) to manufacture a laminate sheet, and a stretching step of stretching the resulting laminate sheet in at least one direction.

Advantageous Effects of Invention

In the adhesive sheet laminate according to the present invention, not only a substrate layer and an adhesive layer but also a release layer can be laminated by co-extrusion, and therefore, the adhesive sheet laminate can be prepared by a small number of steps without excessive cost. Moreover, by carrying out stretching after co-extrusion, strength of the adhesive sheet laminate can be increased, and besides, peel force of the release layer can also be adjusted. On that account, the adhesive sheet laminate can also realize good adhesion properties and releasability in addition to high strength.

DESCRIPTION OF EMBODIMENTS

Hereinafter, the present invention will be described in detail, but the present invention is not limited to the following embodiments, and arbitrary modifications can be made without departing from the scope of the present invention. The "to" that indicates a numerical value range is used to mean that the range includes numerical values written before and after that as the lower limit and the upper limit.

<Adhesive Sheet Laminate>

The adhesive sheet laminate according to the present embodiment comprises a substrate layer, an adhesive layer, and a release layer laminated on a surface of the adhesive layer, and has a tensile elastic modulus of 2000 MPa or more.

The substrate layer is composed of a thermoplastic resin composition (A) containing a polypropylene-based resin as a main component.

The adhesive layer is a layer having an indentation elastic modulus of 100 MPa or less in the thickness direction, and is composed of a thermoplastic resin composition (B) containing a thermoplastic resin (b) as a main component. A melt flow rate of the thermoplastic resin composition (B) is 0.1 to 30 g/10 min. The thermoplastic resin (b) is compatible with the polypropylene-based resin that is a main component of the thermoplastic resin composition (A), and has a tensile elastic modulus of 100 MPa or less and a melting point of 175° C. or less.

The release layer is composed of a thermoplastic resin composition (C) containing a thermoplastic resin (c) as a main component. A melt flow rate of the thermoplastic resin composition (C) is 0.1 to 30 g/10 min. The thermoplastic resin (c) is incompatible with the thermoplastic resin (b) for constituting the adhesive layer, and has a melting point of 175° C. or less.

(Substrate Layer)

The substrate layer is composed of a thermoplastic resin composition (A) containing a polypropylene-based resin as a main component.

In the present specification, a main component in a thermoplastic resin composition means that the content in the total amount of thermoplastic resins contained in the layer is 70% by mass or more. That is to say, the content of the polypropylene-based resin is 70% by mass or more, preferably 80% by mass or more, and more preferably 90% by mass or more, based on the total amount of thermoplastic resins contained in the substrate layer. A thermoplastic resin contained in the thermoplastic resin composition (A) may be the polypropylene-based resin in an amount of 100% by mass, that is, the thermoplastic resin composition may be a resin composition containing only the polypropylene-based resin as the thermoplastic resin.

Examples of the polypropylene-based resins include, but not limited to, homopolymers obtained by homopolymerizing propylene, such as isotactic homopolypropylene and syndiotactic homopolypropylene, and polypropylene-based copolymers having various stereoregularities that are obtained by copolymerizing propylene as a main constituent with α-olefins such as ethylene, 1-butene, 1-pentene, 1-hexene, 4-methyl-1-pentene, 1-heptene and 1-octene.

The polypropylene-based copolymer may be that of binary system or multi-component system of ternary or higher system, or may be any of a random copolymer, a block copolymer, an alternating copolymer, and a graft copolymer.

In order that the substrate layer may impart required rigidity to the adhesive sheet laminate, a tensile elastic modulus of the polypropylene-based resin is preferably 500 MPa or more, more preferably 800 MPa or more, still more preferably 1000 MPa or more, and still much more preferably 1400 MPa or more. The tensile elastic modulus of the polypropylene-based resin is a storage elastic modulus at 23° C. that is measured in accordance with the method described in the examples described later.

The polypropylene-based resin may be synthesized, or a commercial product may be used, and the commercial product is, for example, NOVATEC PP FY-4 manufactured by Japan Polypropylene Corporation.

The polypropylene-based resins that are main components may be used singly or may be used by mixing two or more, and when two or more resins are used, the total content of them is required to be 70% by mass or more.

The thermoplastic resin composition (A) may contain thermoplastic resins other than the polypropylene-based resin.

Examples of other thermoplastic resins include, but not limited to, polyolefin-based resins other than the polypropylene-based resin, such as a polyethylene-based resin and polybutene; and functional group-containing olefin-based resins, such as an ethylene-vinyl acetate copolymer, an ethylene-(meth)acrylic acid copolymer, a metal salt (ionomer) of an ethylene-(meth)acrylic acid copolymer, an ethylene-(meth)acrylic acid alkyl ester copolymer, maleic acid-modified polyethylene, and maleic acid-modified polypropylene. These may be used singly or may be used in combination of two or more.

The number of carbon atoms of the alkyl group in the ethylene-(meth)acrylic acid alkyl ester copolymer is preferably 1 to 8. In the present specification, (meth)acrylic acid means at least one of acrylic acid and methacrylic acid.

The polyethylene-based resin is preferably, for example, high-density polyethylene, medium-density polyethylene, low-density polyethylene, linear low-density polyethylene, or a copolymer of ethylene and an α-olefin, and from the viewpoint of improvement in moldability, high-density polyethylene or low-density polyethylene is more preferable.

Specific examples of the copolymers of ethylene and α-olefins include polymers obtained by copolymerizing ethylene as a main constituent with propylene, 1-butene, 1-pentene, 1-hexene, 4-methyl-1-pentene, 1-heptene, 1-octene, 1-nonene, 1-dence, and the like.

The substrate layer is preferably a porous layer because desired degree of whiteness or opacity are obtained, cushioning properties of the substrate layer can be improved, and influence on the appearance by an air trap or the like occurring during attaching to an adherend is small. On that account, the thermoplastic resin composition (A) may further contain a filler in addition to the thermoplastic resin.

Due to the filler, pores are easily formed in the substrate layer, and adjustment of the degree of whiteness of the substrate layer is facilitated by the filler.

As the filler, any of an inorganic filler and an organic filler can be used, and the fillers may be used singly or may be used in combination of two or more.

Examples of the inorganic fillers include calcium carbonate, calcined clay, silica, diatomaceous earth, talc, barium sulfate, aluminum sulfate, magnesium oxide, alumina, and an ultraviolet light absorbing filler. Examples of the ultraviolet light absorbing fillers include titanium dioxide and zinc oxide.

Examples of the organic fillers include polyethylene terephthalate, polybutylene terephthalate, polycarbonate, nylon-6, nylon-6,6, a cycloolefin polymer, and a copolymer of a cycloolefin and ethylene. A resin having a melting point higher than the melting point of the polypropylene-based resin used or having a glass transition point can also be mentioned as the organic filler.

An average particle diameter of the filler is preferably 0.01 μm or more, and more preferably 0.05 μm or more, from the viewpoint that the prescribed pores are easily obtained. From the viewpoint of homogeneity of pores, the average particle diameter is preferably 10 μm or less, and more preferably 8 μm or less.

The average particle diameter of the filler is an average value of measured values of diameters of 100 particles sampled at random from an observation area obtained by observing a cut surface of the substrate layer in the thickness direction with an electron microscope. The particle diameter is determined from a maximum value (maximum diameter) of a distance between two points on the contour of a particle.

The content of the filler in the thermoplastic resin composition (A) is preferably 5% by mass or more, and more preferably 10% by mass or more, from the viewpoint that a sufficient number of pores are easily obtained, and desired degree of whiteness or opacity are easily imparted to the adhesive sheet laminate. On the other hand, the content is preferably 65% by mass or less, and more preferably 50% by mass or less, from the viewpoint that the effects of the present invention are favorably exhibited.

The thermoplastic resin composition (A) may further contain various additives, such as an ultraviolet light absorber, an antistatic agent, an antioxidant, an anti-aging agent, a colorant (pigment) and a slip agent usually used, according to the purpose, as long as the effects of the present invention are not impaired.

The substrate layer undergoes co-extrusion and co-stretching together with the adhesive layer and the release layer. On that account, the resins that become main components of the thermoplastic resin compositions (A) to (C) for constituting the substrate layer, the adhesive layer and the release layer, respectively preferably have nearly equal melting points. A melting point of the polypropylene-based resin that becomes a main component of the thermoplastic resin composition (A) is about 160 to 180° C., and the melting point can be adjusted by the type or copolymerization ratio of a copolymerization component, a molecular weight, a molecular weight distribution, stereoregularity, etc.

The thickness of the substrate layer is usually 10 to 300 μm.

From the viewpoints of impartation of rigidity to the adhesive sheet laminate, improvement in workability during attaching, and prevention of material fracture during peeling due to insufficient breaking strength, the thickness of the substrate layer is preferably 30 μm or more, and more preferably 50 μm or more. From the viewpoints of attachability to a curved surface and followability to an adherend surface shape, the thickness is preferably 200 μm or less, and more preferably 150 μm or less.

On the other hand, when the adhesive sheet laminate has a support layer described later, the total thickness of the substrate layer and the support layer is required to be in the above range, and the substrate layer may be relatively thin. In this case, the thickness of the substrate layer is preferably 0.1 μm or more, more preferably 0.5 μm or more, and still more preferably 1 μm or more, from the viewpoint of molding stability. The upper limit is not particularly limited, and it is preferably adjusted so that the total thickness of the substrate layer and the support layer may become 300 μm or less.

(Adhesive Layer)

The adhesive layer is composed of a thermoplastic resin composition (B) containing a thermoplastic resin (b) as a main component. A melt flow rate (sometimes referred to as "MFR" hereinafter) of the thermoplastic resin composition (B) is 0.1 to 30 g/10 min, and an indentation elastic modulus of the adhesive layer in the thickness direction is 100 MPa or less. The melt flow rate in the present specification means a melt flow rate (230° C., load of 2.16 kg) measured in accordance with JIS K7210:1999. The indentation elastic modulus means an indentation elastic modulus of the adhesive layer surface measured with a nanoindenter.

By setting the indentation elastic modulus of the adhesive layer in the thickness direction to 100 MPa or less, followability to an adherend surface shape becomes good when the adhesive layer is attached to the adherend, and excellent adhesion properties are exhibited due to the anchor effect. The indentation elastic modulus is preferably 50 MPa or less, and more preferably 10 MPa or less. From the viewpoint of adhesive residue of the adhesive layer, the indentation elastic modulus is preferably 0.1 MPa or more, more preferably 0.5 MPa or more, and still more preferably 1 MPa or more. The indentation elastic modulus is a value measured with a nanoindenter regarding the adhesive layer surface.

The indentation elastic modulus can be adjusted by the type or compounding of the thermoplastic resin to be contained in the thermoplastic resin composition (B), the thickness of the adhesive layer, etc. For example, if the thickness of the adhesive layer is increased, the indentation elastic modulus increases, and if it is decreased, the indentation elastic modulus decreases.

Since the MFR of the thermoplastic resin composition (B) is 0.1 g/10 min or more, the resin composition can be extruded at a low extrusion pressure. The MFR is preferably 1 g/10 min or more. Since the MFR is 30 g/10 min or less, discharge stability of the resin composition during extrusion can be enhanced. The MFR is preferably 20 g/10 min or less, and more preferably 10 g/10 min or less.

The MFR can be adjusted by the thermoplastic resin (b) or the constitution of other components.

The content of the thermoplastic resin (b) in the total amount of thermoplastic resins contained in the thermoplastic resin composition (B) is 70% by mass or more, preferably 80% by mass or more, and more preferably 90% by mass or more. A thermoplastic resin contained in the thermoplastic resin composition (B) may be the thermoplastic resin (b) in an amount of 100% by mass, that is, only the thermoplastic resin (b).

The thermoplastic resin (b) is a resin compatible with the polypropylene-based resin that is a main component of the thermoplastic resin composition (A) for constituting the substrate layer. Due to this, adhesiveness between the substrate layer and the adhesive layer becomes good. A tensile elastic modulus of the thermoplastic resin (b) is 100 MPa or less, and a melting point thereof is 175° C. or less.

Specifically, the thermoplastic resin (b) is preferably an olefin-based elastomer or a styrene-based elastomer.

Whether the thermoplastic resin (b) is compatible with the polypropylene-based resin or not can be judged by a solubility parameter (SP value).

The thermoplastic resins (b) that become main components may be used singly or may be used by mixing two or more, and when two or more resins are used, the total amount thereof is required to be 70% by mass or more.

The olefin-based elastomer is not particularly limited as long as it has a tensile elastic modulus of 100 MPa or less, and is preferably, for example, a copolymer of propylene and an α-olefin such as ethylene, 1-butene, 1-pentene, 1-hexene, 4-methyl-1-pentene, 1-heptene, 1-octene, 1-nonene or 1-decene. The copolymer may be that of binary system or multi-component system of ternary or higher system. If the ratio of repeating units derived from propylene in the copolymer of propylene and an α-olefin is high, the elastic modulus tends to increase.

When such a copolymer of propylene and an α-olefin as above is used as the olefin-based elastomer, a resin different from the polypropylene-based resin that is a main component of the thermoplastic resin composition (A) is used. Specifically, the polypropylene-based resin in the thermoplastic resin composition (A) preferably has a tensile elastic modulus of 500 MPa or more, and more preferably 800 MPa or more, while the thermoplastic resin (b) that becomes a main component of the thermoplastic resin composition (B) has a tensile elastic modulus of 100 MPa or less, and on this point, both can be distinguished. The tensile elastic modulus of the thermoplastic resin (b) is a storage elastic modulus at 23° C. that is measured in accordance with the method described in the examples described later.

Specific examples of the copolymers include a propylene/ethylene copolymer, and terpolymers, such as a propylene/ethylene/1-butene copolymer, a propylene/ethylene/1-pentene copolymer, a propylene/ethylene/1-hexene copolymer, a propylene/ethylene/4-methyl-1-pentene copolymer, a propylene/ethylene/1-heptene copolymer, a propylene/ethylene/1-octene copolymer, a propylene/ethylene/1-nonene copolymer, and a propylene/ethylene/1-decene copolymer.

Above all, a propylene/ethylene copolymer or a propylene/ethylene/1-butene copolymer is particularly preferable from the viewpoints of adhesive force and high compatibility with the polypropylene-based resin contained in the substrate layer.

The olefin-based elastomer may be synthesized, or a commercial product may be used, and examples of the commercial products include TAFMER PN-3560 manufactured by Mitsui Chemicals, Inc., and ZELAS MC717R4 manufactured by Mitsubishi Chemicals, Inc.

The styrene-based elastomer is not particularly limited as long as the tensile elastic modulus is 100 MPa or less, and examples thereof include a hydrogenated styrene-butadiene copolymer (HSBR), a styrene-ethylene/butylene-ethylene copolymer (SEBC), and a styrene-ethylene/butylene-styrene copolymer (SEBS). Above all, a hydrogenated styrene-butadiene copolymer (HSBR) is preferable because thermal stability is good.

From the viewpoints of flexibility and adhesive strength of the adhesive layer, the styrene content in the styrene-based elastomer is preferably 30% by mass or less, and more preferably 20% by mass or less. From the viewpoint of adhesive strength, the styrene content is preferably 5% by mass or more, and more preferably 8% by mass or more.

The styrene-based elastomer may be synthesized, or a commercial product may be used, and the commercial product is, for example, DYNARON 1320P manufactured by JSR Corporation.

MFR of the thermoplastic resin (b) is preferably 0.1 g/10 min or more, and more preferably 1 g/10 min or more, from the viewpoint of control of MFR of the thermoplastic resin composition (B). MFR of the thermoplastic resin (b) is preferably 30 g/10 min or less, more preferably 20 g/10 min or less, and still more preferably 10 g/10 min or less.

The thermoplastic resin composition (B) may contain other components as long as the effects of the present invention are not impaired.

One of the other components is, for example, a tackifier. By compounding a tackifier, elastic modulus of the adhesive layer decreases.

Examples of the tackifiers include a synthetic petroleum-based resin, a terpene resin, a terpene phenol resin, an aromatic modified terpene resin, a coumarone-indene resin, natural resin rosin, modified rosin, glycerol ester rosin, pentaerythritol ester rosin, a phenol resin, a xylene resin, an alicyclic petroleum resin, and a dicyclopentadiene resin. These may be used singly, or may be used by mixing two or more.

The thermoplastic resin composition (B) may contain, in addition to the above components, various additives, such as an ultraviolet light absorber, an antistatic agent, an antioxidant, an anti-aging agent, a colorant (pigment) and a slip agent usually used, when needed, as long as the effects of the present invention are not impaired.

The adhesive layer undergoes co-extrusion and co-stretching together with the substrate layer and the release layer. Considering that the melting point of the polypropylene-based resin that becomes a main component of the thermoplastic resin composition (A) is about 160 to 180° C. and the adhesive layer is co-stretched with the substrate layer containing the polypropylene-based resin at about 140 to 160° C., a melting point of the thermoplastic resin (b) is 175° C. or less, preferably 170° C. or less, and more preferably 165° C. or less. If the melting point is too low, there is concern that stretch orientation is not achieved, so that the melting point is preferably 140° C. or more, and more preferably 150° C. or more.

When the thermoplastic resin (b) does not have a melting point, the glass transition point is preferably 110° C. or less.

From the viewpoint of adhesive force, the thickness of the adhesive layer is preferably 1 μm or more, more preferably 2 μm or more, and still more preferably 3 μm or more. From the viewpoint of releasability from the release layer, the thickness of the adhesive layer is preferably 30 μm or less, more preferably 20 μm or less, and still more preferably 10 μm or less.

(Release Layer)

The release layer is composed of a thermoplastic resin composition (C) containing a thermoplastic resin (c) as a main component. MFR of the thermoplastic resin composition (C) is 0.1 to 30 g/10 min.

Since the MFR of the thermoplastic resin composition (C) is 0.1 g/10 min or more, the resin composition can be extruded at a low extrusion pressure. The MFR is preferably 1 g/10 min or more. Since the MFR is 30 g/10 min or less, discharge stability of the resin composition during extrusion can be enhanced. The MFR is preferably 20 g/10 min or less, and more preferably 10 g/10 min or less.

The MFR can be adjusted by the thermoplastic resin (c) or the constitution of other components.

The content of the thermoplastic resin (c) in the total amount of thermoplastic resins contained in the thermoplastic resin composition (C) is 70% by mass or more, preferably 80% by mass or more, and more preferably 90% by mass or more. A thermoplastic resin contained in the thermoplastic resin composition (C) may be the thermoplastic resin (c) in an amount of 100% by mass, that is, only the thermoplastic resin (c).

The thermoplastic resin (c) is a resin incompatible with the thermoplastic resin (b) that is a main component of the thermoplastic resin composition (B). On that account, the release layer composed of the thermoplastic resin composition (C) containing the thermoplastic resin (c) as a main component has good releasability from the adhesive layer.

Whether the thermoplastic resin (c) is incompatible with the thermoplastic resin (b) or not can be judged by the density or the solubility parameter of the thermoplastic resin (c).

Specifically, when the thermoplastic resin (c) is polyethylene, it is preferable to select polyethylene having a density of less than 0.94 g/cm³. When the thermoplastic resin (c) is a resin other than polyethylene, it is preferable to select a resin having a solubility parameter (SP value) of 8.3 or more, it is more preferable to select a resin having that of 9 or more, and it is still more preferable to select a resin having that of 10 or more.

By using the thermoplastic resin composition (C) containing such a thermoplastic resin (c) as a main component, a release layer having good releasability from the adhesive layer can be formed. The SP value in the present specification is calculated based on the following Fedors method.

$$SP\ value\ (\delta)=[\Sigma E/\Sigma V]^{1/2}$$

E: cohesive energy constant (cal/mol); determined as a sum of cohesive energy constants of atoms or atomic groups for constituting a compound.

V: molar volume (cm³/mol); determined as a sum of molar volumes of atoms or atomic groups for constituting a compound.

As the cohesive energy constant, a value described in "Polymer Handbook 4th Edition, written by John Wiley & Sons" can be used. In the present specification, the unit of the SP value is (cal/cm³)^{1/2}.

The thermoplastic resin (b) and the polypropylene-based resin that is a main component of the thermoplastic resin composition (A) are compatible with each other, and therefore, that the thermoplastic resin (c) is incompatible with the thermoplastic resin (b) means that the thermoplastic resin (c) is also incompatible with the polypropylene-based resin in the thermoplastic resin composition (A).

The present inventors have found that by selecting a resin having an SP value of 8.3 or more as the thermoplastic resin (c) considering that the SP value of polypropylene is generally 8.0, a release layer having better releasability is obtained. However, when polyethylene is selected as the thermoplastic resin (c), polyethylenes having different densities differ in compatibility with polypropylene even though they have the same SP values. That is to say, low-density polyethylene having a density of less than 0.94 g/cm³ has proved to be preferable as the thermoplastic resin (c) because it has low compatibility with polypropylene. Here, the density of polyethylene is a value measured in accordance with Method D (Density gradient column method) of "Plastics-Methods of determining the density and relative density of non-cellular plastics" of JIS K 7112:1999.

The release layer undergoes co-extrusion and co-stretching together with the substrate layer and the adhesive layer. The melting point of the polypropylene-based resin that becomes a main component of the thermoplastic resin composition (A) is about 160 to 180° C., and the release layer is co-stretched with the substrate layer containing the polypropylene-based resin at about 140 to 160° C. On that account, the melting point of the thermoplastic resin (c) is 175° C. or less, preferably 170° C. or less, and more preferably 165° C. or less, from the viewpoint that the co-extrusion and co-stretching are favorably carried out. If the melting point is too low, there is concern that stretch orientation is not achieved, so that the melting point is preferably 140° C. or more, and more preferably 150° C. or more.

When the thermoplastic resin (c) does not have a melting point, the glass transition point is preferably 110° C. or less.

The thermoplastic resins (c) that become main components may be used singly or may be used by mixing two or more, and when two or more resins are used, the total amount thereof is required to be 70% by mass or more.

The thermoplastic resin (c) is not particularly limited as long as it has a melting point of 175° C. or less and is a resin exhibiting incompatibility with the aforesaid thermoplastic resin (b). For example, a low-density polyethylene-based resin (LDPE), an ethylene-methyl acrylate (EMA) copolymer, an ethylene-ethyl acrylate (EEA) copolymer, a polystyrene-based resin, a polymethyl methacrylate-based resin (PMMA), a polyacetal-based resin (POM), an ethylene-vinyl alcohol (EVOH) copolymer, etc. can be used. Above all, a low-density polyethylene-based resin, a polystyrene-based resin, or an ethylene-vinyl alcohol copolymer is preferable from the viewpoint of delamination force (releasability) between the adhesive layer and the release layer after co-stretching. The low-density polyethylene-based resin means a polyethylene-based resin having a density of less than 0.94 g/cm³.

The above resin may be synthesized, or a commercial product may be used, and examples of the commercial products include NOVATEC LD LC540 manufactured by Japan Polyethylene Corporation, HIPS 408 manufactured by PS Japan Corporation, and EVAL G156B manufactured by Kuraray Co., Ltd.

MFR Of the thermoplastic resin (c) is preferably 0.1 g/10 min or more, and more preferably 1 g/10 min or more, from the viewpoint of control of MFR of the thermoplastic resin composition (C). MFR of the thermoplastic resin (c) is preferably 30 g/10 min or less, more preferably 20 g/10 min or less, and still more preferably 10 g/10 min or less.

The thermoplastic resin composition (C) may contain other components as long as they do not affect adhesive force.

One of the other components is, for example, a release agent. By compounding a release agent, peel force of the release layer can be favorably controlled.

Examples of the release agents include, but not limited to, an amine-based release agent, a silicon-based release agent, a fluorine-based release agent, a hydrocarbon-based release agent, and a metal soap-based release agent. These release agents may be used singly or may be used in combination of two or more.

Above all, an amine-based release agent, a silicon-based release agent, a fluorine-based release agent or a metal soap-based release agent is preferable, an amine-based release agent is more preferable, and among the amine-based release agents, a saturated fatty acid bisamide is more preferable.

The thermoplastic resin composition (C) may contain, in addition to the above components, various additives, such as an ultraviolet light absorber, an antistatic agent, an antioxidant, an anti-aging agent, a colorant (pigment) and a slip agent usually used, when needed, as long as the effects of the present invention are not impaired.

By adjusting the thermoplastic resin (c), other components, stretching conditions, etc. for the thermoplastic resin composition (C) containing the thermoplastic resin (c) as a main component according to the use application, an adhesive sheet laminate having intended peel force can be obtained.

The thickness of the release layer is preferably 1 μm or more, more preferably 3 μm or more, and still more preferably 5 μm or more, from the viewpoint of preventing material fracture during peeling. From the viewpoint of preventing peeling such as during molding due to strong stiffness, the thickness of the release layer is preferably 100 μm or less, more preferably 80 μm or less, and still more preferably 50 μm or less.

In order to enhance workability of the peeling work, an auxiliary release layer may be provided on a surface of the release layer on the side opposite to the adhesive layer. As the auxiliary release layer, the same layer as a support layer described later can be mentioned, and a preferred one is the same as that for the support layer.

(Support Layer)

The adhesive sheet laminate has the substrate layer, the adhesive layer, and the release layer in this order, but it may further have a support layer on a surface of the substrate layer on the side opposite to the adhesive layer.

When the adhesive sheet laminate is used as an adhesive sheet by peeling only the release layer from the adhesive layer surface, adjustment of rigidity and workability of the adhesive sheet can be easily carried out by providing the support layer.

The support layer is not particularly restricted as long as it can impart desired rigidity and workability to the adhesive sheet. For example, a thermoplastic resin film containing a thermoplastic resin such as a polyolefin-based resin, a polyester-based resin or polyvinyl chloride can be mentioned. As the thermoplastic resin, these may be used singly or may be used by mixing two or more.

The support layer may be a single layer or may have a laminated structure of two or more layers.

From the viewpoint of adhesion to the substrate layer, the support layer is preferably one having an SP value close to that of the substrate layer, and therefore, a polyolefin-based resin is preferable.

The support layer is preferably a porous layer similarly to the substrate layer from the viewpoints that desired degree of whiteness or opacity are obtained, cushioning properties of the support layer can be improved, and influence on the appearance by an air trap or the like occurring during attaching to an adherend is small. In order to make the porous layer, for example, a method including incorporating a filler in a resin composition for constituting the support layer and stretching the resulting layer can be mentioned similarly to the substrate layer.

As the filler, the same one as the filler capable of being contained in the thermoplastic resin composition (A) can be mentioned, and a preferred average particle diameter of the filler and a preferred content of the filler in the resin composition are also the same as those of the filler in the thermoplastic resin composition (A).

(Other Layers)

When the adhesive sheet laminate has a support layer, the adhesive sheet laminate may further have at least one of a printed layer and a print receiving layer on a surface of the support layer on the side opposite to the side where the substrate layer is located.

The printed layer is a layer composed of letters, images and the like formed with a printing ink or a toner, and as printing methods, various printing methods, such as offset printing, inkjet method, electrophotographic (laser) method, thermal recording method and thermal transfer method, can be used. Therefore, the printed layer is located on the outermost surface of the adhesive sheet laminate on the side opposite to the release layer. The printed layer is required to cover at least a partial area of the adhesive sheet laminate surface, or may cover the whole area thereof.

As the printed layer, a conventionally known one can be used in a known way.

The print receiving layer is a layer that functions as an ink- or toner-receiving layer when a printed layer is provided.

Due to the properties of the print receiving layer, various characteristics of the printed layer, such as abrasion resistance, antistatic properties, printability, water resistance and storage stability, can be adjusted.

As the print receiving layer, a conventionally known one can be used in a known way.

In the adhesive sheet laminate, other arbitrary layers can be provided in addition to the printed layer and the print receiving layer, as long as the effects of the present invention are not impaired. Examples of the other arbitrary layers include a protective layer that is further provided on a surface of the printed layer, a printed layer or a print receiving layer that is further provided on a surface of the release layer, that is, a surface on the side opposite to the adhesive layer side, and an antistatic layer.

(Physical Properties)

In the adhesive sheet laminate, by forming the substrate layer, the adhesive layer and the release layer from the thermoplastic resin compositions (A) to (C), respectively, these layers can be laminated by co-extrusion and can be subjected to the subsequent co-stretching step. Through the co-stretching step, the tensile elastic modulus of the adhesive sheet laminate can be set to 2000 MPa or more. The tensile elastic modulus is preferably 3000 MPa or more, and more preferably 4000 MPa or more. The upper limit of the tensile elastic modulus of the adhesive sheet laminate is not particularly limited, but it is usually 6000 MPa or less. By setting the tensile elastic modulus to the above lower limit or more, the adhesive sheet laminate can have required rigidity, and effects, such as improvement in workability during attaching to an adherend, improvement in punching workability, and prevention of elongation/breaking of the sheet during peeling from an adherend, are obtained.

The tensile elastic modulus in the present specification means a storage elastic modulus at 23° C. that is measured in accordance with the method described in the examples described later. The tensile elastic modulus is measured regarding TD (vertical direction), but when the TD is not clear, a measured value in a direction in which the highest tensile elastic modulus in the adhesive sheet laminate is adopted.

Through the co-stretching step, not only the above tensile elastic modulus but also a balance between adhesive force and peel force occurring between the adhesive layer and the release layer, can be adjusted to a proper range. Due to this, good releasability is exhibited, and besides, excellent adhesiveness can be achieved when the adhesive layer is attached to an adherend.

Releasability of the release layer is evaluated by peel force (peel strength) obtained by a T-type tensile test at a pulling rate of 300 mm/min in a test environment of a temperature of 20 to 23° C. and a humidity of 50 to 60% RH, and from the viewpoint of prevention of material fracture of the adhesive layer and the substrate layer, the peel force is preferably 1 N/15 mm or less, and more preferably 0.5 N/15 mm or less. The lower limit is not particularly limited, but from the viewpoint of prevention of unintentional peeling of the release layer, the peel force is preferably 0.1 N/15 mm or more.

The adhesion properties due to the adhesive layer after peeling of the release layer is measured in accordance with JIS Z 0237:2000. The adhesive force obtained in such measurement is preferably 0.3 N/15 mm or more, and more preferably 0.5 N/15 mm or more. The upper limit is not particularly limited, but from the viewpoint of peel force between the adhesive layer and the release layer, the adhesive force is preferably 10 N/15 mm or less.

(Method for Manufacturing Adhesive Sheet Laminate)

The adhesive sheet laminate according to the present embodiment is obtained by carrying out co-extrusion of the substrate layer, the adhesive layer and the release layer and then carrying out co-stretching of them.

Specifically, the method for manufacturing the adhesive sheet laminate comprises a co-extrusion step of co-extruding the thermoplastic resin composition (A), the thermoplastic resin composition (B) and the thermoplastic resin composition (C) to manufacture a laminate sheet, and a stretching step of stretching the resulting laminate sheet in at least one direction.

By laminating the layers by co-extrusion in the co-extrusion step, the number of steps is decreased, resulting in cost reduction, If the adhesive layer is formed by applying the thermoplastic resin composition (B) onto the substrate layer, a large amount of an organic solvent used as a solvent or a dispersion medium needs to be removed during drying after the application. However, by adopting the co-extrusion step, there is no need to use the organic solvent, and there is an advantage of low environmental burden.

By stretching the laminate sheet obtained in the co-extrusion step in at least one direction in the stretching step, the peel force of the release layer from the adhesive layer can be controlled to a proper range. If the peel force is too low, the release layer peels off during, for example, molding, printing, or transportation. On the other hand, if the peel force is too high, there occurs a disadvantage such that it is difficult to peel off the release layer before use, or the adhesive layer partially remains on the release layer surface.

It is difficult to control the peel force only by carrying out co-extrusion of multilayers including the adhesive layer and the release layer, but by further carrying out co-stretching, the peel force can be easily controlled. For example, by increasing a stretch ratio, the peel force between the adhesive layer and the release layer can be decreased.

Such co-extrusion and co-stretching have been able to be achieved by selecting the substrate layer, the adhesive layer and the release layer composed of the specific thermoplastic resin composition (A) to (C) in the adhesive sheet laminate.

For example, when the adhesive layer is formed by using the thermoplastic resin composition (B) containing an olefin-based elastomer or a styrene-based elastomer as the thermoplastic resin (b) and the release layer is formed by using the thermoplastic resin composition (C) containing a polystyrene-based resin, an ethylene-vinyl alcohol copolymer or low-density polyethylene as the thermoplastic resin (c), the stretch ratio of the laminate sheet including the substrate layer, the adhesive layer and the release layer after the co-extrusion is preferably about 5 to 10 times. When the laminate sheet is biaxially stretched, the sheet is preferably stretched in the machine direction, namely longitudinal direction (MD) of the laminate sheet, at a stretch ratio of about 2 to 5 times, and is preferably stretched in the transverse direction, namely width direction (TD) of the laminate sheet, at a stretch ratio of about 5 to 10 times.

The adhesive sheet laminate is usually appropriately cut or die-cut according to the use application before use. A proper peel force varies also depending on the area given after cutting or die-cutting. For example, when the area is small, a relatively high peel force is required, and when the area is large, a relatively low peel force is enough. As just described, the stretch ratio or the materials of the layers previously mentioned may be appropriately selected according to the use application to control the peel force to a proper range.

When a support layer is provided on a surface of the substrate layer, a method for forming the support layer can be appropriately selected. For example, the support layer may be laminated on a surface of the substrate layer that has undergone the co-extrusion step and the stretching step, but any one of the following methods (a) to (c) is preferable.

(a) A laminate sheet is prepared by carrying out co-extrusion of the support layer together with the substrate layer, the adhesive layer and the release layer, and the laminate sheet is co-stretched in the stretching step to obtain an adhesive sheet laminate having the support layer formed therein.

(b) A laminate sheet is prepared by carrying out co-extrusion of the substrate layer, the adhesive layer and the release layer, then on a surface of the substrate layer of the laminate sheet, the support layer is extrusion laminated, and thereafter, the whole is co-stretched to obtain an adhesive sheet laminate having the support layer formed therein.

(C) On a surface of the support layer, the substrate layer, the adhesive layer and the release layer are co-extrusion laminated, and then, the whole is co-stretched to obtain an adhesive sheet laminate having the support layer formed therein.

EXAMPLES

Hereinafter, the present invention will be more specifically described with reference to examples and comparative examples. The materials, amounts used, ratios, operations, etc. shown in the following examples can be appropriately changed without departing from the spirit of the present invention. Accordingly, the scope of the present invention is not restricted to the specific examples shown below.

[Evaluation Method]

(Melting Point)

A melting point of the thermoplastic resin to constitute the thermoplastic resin composition was measured in a sample quantity of 10 mg at a heating rate of 10° C./min using a differential scanning calorimeter (AS-3DX manufactured by Hitachi High-Tech Science Corporation), and the melting peak temperature was determined as a melting point. The result is set forth in Table 2. In the table, "–" means that a melting point is not exhibited.

(Glass Transition Point)

A glass transition point of the thermoplastic resin to constitute the thermoplastic resin composition was determined by the following method. First, a sheet having a thickness of 500 μm was prepared from the thermoplastic resin using a hydraulic press, and this was cut into length 30 mm×width 15 mm, thereby obtaining a test specimen. Using this test specimen, dynamic viscoelasticity measurement was carried out with a solid viscoelasticity measurement device (manufactured by TA Instruments Japan Inc., RSA-III) under the conditions of a chuck-to-chuck distance of 20 mm, a measuring frequency of 10 Hz, an amount of strain of 0.1%, a heating rate of 10° C./min, and a tensile mode, thereby determining loss tangent (tan δ). A temperature at which the resulting tan δ showed its peak was taken to be a glass transition temperature. The result is set forth in Table 2.

(Thickness)

The total thickness of the whole adhesive sheet laminate was measured with a constant pressure thickness measuring instrument (manufactured by TECLOCK Co., Ltd., trade name: PG-01J) in accordance with JIS K7130:1999.

In order to measure the thickness of each layer in the adhesive sheet laminate, the adhesive sheet laminate was cooled to a temperature of –60° C. or less with liquid nitrogen, and to the sample placed on a glass plate, a razor blade (manufactured by Schick Japan K.K., trade name: Proline Blade) was applied at right angles to cut the sample, thereby preparing a sample for cross-sectional observation. The resulting sample was subjected to cross-sectional observation using a scanning electron microscope (manufactured by JEOL Ltd., trade name: JSM-6490), and from the composition appearance, a boundary line for each thermoplastic resin composition was determined, and a thickness ratio of each layer was determined. By multiplying the total thickness of the whole adhesive sheet laminate measured above by the thickness ratio of each layer observed, a thickness of each layer in the adhesive sheet laminate was determined. The results are set forth in Table 2.

(Melt Flow Rate: MFR)

MFR of the thermoplastic resin was measured using a small melt indexer (manufactured by TATEYAMA KAGAKU INDUSTRY CO., LTD., trade name OK-0309) in accordance with JIS K7210:1999. As the measurement conditions, the measurement temperature was set to 230° C., and the load was set to 2.16 kg. The result is set forth in Table 2.

(Tensile Elastic Modulus of Thermoplastic Resin (b))

A sheet having a thickness of 500 μm was prepared from the thermoplastic resin (b) using a hydraulic press, and this was cut into length 30 mm×width 15 mm to obtain a test specimen. Using this test specimen, dynamic viscoelasticity measurement was carried out with a solid viscoelasticity measurement device (manufactured by TA Instruments Japan Inc., RSA-III). The measurement conditions were a chuck-to-chuck distance of 20 mm, a measuring frequency of 10 Hz, an amount of strain of 0.1%, a heating rate of 10° C./min, and a tensile mode, and a storage elastic modulus at 23° C. in TD (vertical direction) was taken to be a tensile elastic modulus. The result is set forth in Table 2.

(Tensile Elastic Modulus of Adhesive Sheet Laminate)

From the adhesive sheet laminate, a test specimen of length 30 mm×width 15 mm was cut out, and dynamic viscoelasticity measurement was carried out with a solid viscoelasticity measurement device (manufactured by TA Instruments Japan Inc., RSA-III). The measurement conditions were a chuck-to-chuck distance of 20 mm, a measuring frequency of 10 Hz, an amount of strain of 0.1%, a heating rate of 10° C./min, and a tensile mode, and a storage elastic modulus at 23° C. in TD (vertical direction) was taken to be a tensile elastic modulus. The result is set forth in Table 2, and it can be said that the tensile elastic modulus is preferably 2000 MPa or more, and more preferably 3000 MPa or more.

(Peel Force)

On the release layer side of the adhesive sheet laminate, a polyethylene terephthalate (PET) film of 50 μm was laminated using a laminating adhesive, and they were allowed to stand still for one day in a test environment of a temperature of 20 to 23° C. and a humidity of 50 to 60% RH, thereby preparing a sample for peel force evaluation.

At the end part of the sample for peel force evaluation with length 200 mm×width 15 mm having been cut out, the release layer and the adhesive layer were a little peeled off from each other. The thus peeled parts were chucked by the upper and lower chucks of a tensile tester (manufactured by ORIENTEC CORPORATION, model number RTG-1225), and a T-type tensile test was carried out at a pulling rate of 300 mm/min in a test environment of a temperature of 20 to 23° C. and a humidity of 50 to 60% RH, thereby measuring a peel force (peel strength). The peel force was evaluated by the following criteria. A and B pass, and C fails. The result is set forth in Table 2.

A (very good): Peel force was 0.5 N/15 mm or less.

B (good): Peel force was more than 0.5 N/15 mm and 1 N/15 mm or less.

C (poor): Peel force was more than 1 N/15 mm, or the substrate layer suffered material fracture.

(Adhesive Force)

An adhesive force of the adhesive sheet laminate due to the adhesive layer was measured in accordance with JIS Z 0237:2000. Specifically, from the adhesive sheet laminate, a test specimen of length 200 mm×width 25 mm was cut out, and the release layer was peeled off to expose the adhesive layer. The adhesive layer part was attached to an adherend SUS 430BA plate whose surface had been washed with toluene, and on the support layer surface, a roller of 2 kg was reciprocated once to pressure bond the adherend. Thirty minutes after the pressure bonding, the test specimen was peeled off in the 180-degree direction at a tensile rate of 300 mm/min to measure an adhesive force. The adhesive force was evaluated by the following criteria. A and B pass, and C fails. The result is set forth in Table 2. In the table, "–" means that when the adhesive layer was exposed, material fracture occurred because the peel force was too large, and measurement of the adhesive force was impossible.

A (very good): Adhesive force was 0.5 N/15 mm or more.

B (good): Adhesive force was 0.3 N/15 mm or more and less than 0.5 N/15 mm.

C (poor): Adhesive force was less than 0.3 N/15 mm.

(Indentation Elastic Modulus of Adhesive Layer)

From the adhesive sheet laminate, the release layer was peeled off, to the support layer surface, a drop of an instant adhesive (manufactured by Toagosei Co., Ltd., Aron Alpha (R), professional impact-resistant) was applied, then the adhesive sheet was fixed to a sample fixing table for exclusive use of a measurement device through the instant adhesive, and thereafter, an indentation elastic modulus of the adhesive layer was measured. As the measurement device, a nanoindenter "ENT-2100" manufactured by ELIONIX INC. was used. The measurement was carried out using a triangular pyramidal diamond indenter (Berkovich indenter) having a ridge line angle of 115° under the conditions of measurement mode: loading and unloading test, maximum load: 3 $\mu$N, retention time when the maximum load was reached: 1 second, and loading rate/unloading rate: 10 $\mu$N/sec, and the resulting measurement data were processed by a dedicated analytical software (version 6.18) attached to the measurement device, thereby determining an indentation elastic modulus (MPa) of the adhesive layer in the thickness direction. The result is set forth in Table 2, and it can be said that the indentation elastic modulus is preferably 100 MPa or less, and more preferably 50 MPa or less. In the table, "–" means that when the release layer was peeled off, material fracture occurred because the peel force was too large, and measurement of an indentation elastic modulus was impossible.

A (very good): Indentation elastic modulus was 50 MPa or less.

B (good): Indentation elastic modulus was more than 50 MPa and 100 MPa or less.

C (poor): Indentation elastic modulus was more than 100 MPa.

Example 1

As the resin composition D1 described in Table 1, a mixture of PP:CaCO$_3$=80:20 (ratio by mass) was melt kneaded with an extruder having been set at 230° C. Thereafter, the kneaded product was fed to an extrusion die having been set at 250° C. and extruded into a sheet, and this was cooled down to 60° C. with a cooling device to obtain an unstretched sheet. This unstretched sheet was heated to 135° C. and stretched 5 times in the machine direction utilizing a peripheral velocity difference of the roll group, thereby forming a support layer.

Subsequently, the resin compositions A1, B1 and C1 to constitute the thermoplastic resin compositions were each melt kneaded with three extruders having been set at 250°

C., then they were extruded in the form of a sheet on the support layer surface in such a manner that the thermoplastic resin composition A1 layer that became the substrate layer faced the support layer, and thereby, a four-layer laminate sheet was obtained, followed by cooling the sheet down to 60° C.

Subsequently, the four-layer laminate sheet was heated to about 150° C. using a tenter oven to stretch the sheet 8.5 times in the transverse direction, and then, the laminate sheet was further heated up to 160° C. to perform heat treatment. Thereafter, the laminate sheet was cooled down to 60° C., and the lug part was slit, thereby obtaining an adhesive sheet laminate having a wall thickness of 100 $\mu$m, resin compositions of layers (release layer/adhesive layer/substrate layer/support layer), components of layers (LDPE/PO-based/PP/PP+CaCO$_3$), thicknesses of layers (10 $\mu$m/5 $\mu$m/15 $\mu$m/70 $\mu$m), and the number of stretching axes of layers (one axis/one axis/one axis/two axes).

Examples 2, 3, and Comparative Examples 1, 2

Adhesive sheet laminates were obtained in the same manner as in Example 1, except that the thermoplastic resin composition for forming the release layer was changed from the resin composition C1 to each of the resin compositions C2, C3, C4 and C5.

Example 4

An adhesive sheet laminate was obtained in the same manner as in Example 3, except that the thermoplastic resin composition for forming the adhesive layer was changed from the resin composition B1 to the resin composition B2.

TABLE 1

| | | | Resin composition |
|---|---|---|---|
| Release layer | C1 | LDPE | Low-density polyethylene resin manufactured by Japan Polyethylene Corporation, trade name: NOVATEC LD LC540 density: 0.950 g/cm$^3$ |
| | C2 | PS | Polystyrene resin manufactured by PS Japan Corporation, trade name: HIPS 408 |
| | C3 | EVOH | Ethylene-vinyl alcohol copolymer manufactured by Kuraray Co., Ltd., trade name: EVAL G156B |
| | C4 | PP | Propylene homopolymer manufactured by Japan Polypropylene Corporation, trade name: NOVATEC PP FY-4 |
| | C5 | HDPE | High-density polyethylene resin manufactured by Japan Polyethylene Corporation, trade name: NOVATEC HD HJ381 density: 0.924 g/cm$^3$ |
| Adhesive layer | B1 | PO-based | $\alpha$-Olefin copolymer manufactured by Mitsui Chemicals, Inc., trade name: TAFMER PN3560 |
| | B2 | St-based | Hydrogenated styrene copolymer manufactured by JSR Corporation, trade name: DYNARON 1320P |
| Substrate layer | A1 | PP | Propylene homopolymer manufactured by Japan Polypropylene Corporation, trade name: NOVATEC PP FY-4 |

19 20

TABLE 1-continued

| Resin composition | | | | |
|---|---|---|---|---|
| Support layer | D1 | PP | Propylene homopolymer manufactured by Japan Polypropylene Corporation, trade name: NOVATEC PP FY-4 | 5 |
| | | CaCO₃ | Heavy calcium carbonate manufactured by BIHOKU FUNNKA KOGYO CO., LTD., trade name: SOFTON 1800, average particle diameter: 1.2 μm | 10 |

TABLE 2

| | | | Example | | | | Comparative Example | |
|---|---|---|---|---|---|---|---|---|
| | | | 1 | 2 | 3 | 4 | 1 | 2 |
| Adhesive sheet laminate | Release layer | Resin composition | C1: LDPE | C2: PS | C3: EVOH | | C4: PP | C5: HDPE |
| | | MFR (g/10 min) | 18 | 9.3 | 20 | | 4.8 | 19 |
| | | Melting point (°C.) | 112 | — | 157 | | 165 | 131 |
| | | Tg (°C.) | −20> | 104 | 50 | | 0 | −20> |
| | | SP value | 8.0 | 8.5 | 19 | | 7.9 | 8.0 |
| | | Thickness | 10 μm | 10 μm | 10 μm | | 10 μm | 10 μm |
| | Adhesive layer | Resin composition | | B1: PO-based | | B2: St-based | B1: PO-based | |
| | | MFR (g/10 min) | | 6.0 | | 3.5 | 6.0 | |
| | | Melting point (°C) | | 160 | | — | 160 | |
| | | Tg (°C.) | | −10 | | 50 | −10 | |
| | | Tensile elastic modulus | | 30.0 | | 3 | 30.0 | |
| | | Thickness | | 5 μm | | 5 μm | 5 μm | |
| | Substrate layer | Resin composition | | A1:PP | | | A1:PP | |
| | | Thickness | | 15 μm | | | 15 μm | |
| | Support layer | Resin composition | | D1:PP | | | D1:PP | |
| | | Thickness | | 70 μm | | | 70 μm | |
| | Tensile elastic modulus (TD) | (MPa) | 3900 | 4000 | 4200 | 4200 | 4200 | 4100 |
| | Adhesive layer Indentation elastic modulus | (MPa) | 20 | 20 | 20 | 5 | — | — |
| | Peel force | (N/15 mm) | 0.9 | 0.5 | 0.1 | 0.1 | Material fracture | Material fracture |
| | | Evaluation | B | A | A | A | C | C |
| | Adhesive force | (N/15 mm) | 0.6 | 0.6 | 0.6 | 0.7 | — | — |
| | | Evaluation | A | A | A | A | — | — |

From the above results, it can be seen that by properly selecting the resin composition for constituting each layer in the adhesive sheet laminate, co-extrusion and co-stretching are possible, and a high-strength adhesive sheet laminate having an excellent balance between the adhesion properties and releasability is obtained.

The present invention has been described in detail with reference to the specific embodiments, but it is obvious to those skilled in the art that various changes and modifications can be made without departing from the spirit and scope of the present invention. The present application is based on Japanese patent application (Japanese Patent Application No. 2020-058708) filed on Mar. 27, 2020, and the contents thereof are incorporated herein by reference.

The invention claimed is:

1. An adhesive sheet laminate comprising a substrate layer, an adhesive layer, and a release layer laminated on a surface of the adhesive layer, wherein the substrate layer is composed of a thermoplastic resin composition (A) containing a polypropylene-based resin as a main component, the adhesive layer is a layer having an indentation elastic modulus of 100 MPa or less in the thickness direction, and is composed of a thermoplastic resin composition (B) containing a thermoplastic resin (b) as a main component and having a melt flow rate of 0.1 to 30 g/10 min, the thermoplastic resin (b) is compatible with the polypropylene-based resin and has a tensile elastic modulus of 100 MPa or less and a melting point of 175° C. or less, the release layer is composed of a thermoplastic resin composition (C) containing a thermoplastic resin (c) as a main component and having a melt flow rate of 0.1 to 30 g/10 min, the thermoplastic resin (c) is a polystyrene-based resin or an ethylene-vinyl alcohol copolymer, has a solubility parameter (SP value) of 8.3 or more, and has a melting point of 175° C. or less, and the adhesive sheet laminate has a tensile elastic modulus of 2000 MPa or more.

2. The adhesive sheet laminate according to claim 1, wherein the thermoplastic resin (b) is an olefin-based elastomer or a styrene-based elastomer.

3. The adhesive sheet laminate according to claim 1, wherein a tensile elastic modulus of the polypropylene-based resin is 500 MPa or more.

4. The adhesive sheet laminate according to claim 1, wherein the substrate layer is a porous layer.

5. The adhesive sheet laminate according to claim 1, comprising a support layer on a surface of the substrate layer on the side opposite to the adhesive layer.

6. A method for manufacturing the adhesive sheet laminate according to claim 1, comprising co-extruding the thermoplastic resin composition (A), the thermoplastic resin composition (B), and the thermoplastic resin composition (C) to manufacture a laminate sheet, and stretching the resulting laminate sheet in at least one direction.

\*   \*   \*   \*   \*